UNITED STATES PATENT OFFICE 2,031,069

STABILIZATION OF OILS AND FATS

William D. Richardson, Donald P. Grettie, and Roy C. Newton, Chicago, Ill., assignors to Swift & Company, Chicago, Ill., a corporation of Illinois No Drawing. Application May 12, 1931,
Serial No. 536,942

6 Claims. (Cl. 99—86)

This invention relates to improvements in the stabilization of oils and fats, and more particularly stabilization of edible oils and fats, whereby the oils and fats are stable not only during storage and distribution in the package, but also when used in the manufacture of food products such as crackers and other bakery products, in which, or in the manufacture of which, water or aqueous liquids are used.

Fats and oils of commerce are subject to deterioration in quality due to oxidation. This deterioration results in large losses in the manufacture and distribution of shortenings and other fat-containing products. The edible oils and fats on deterioration become non-edible and must be used for non-edible purposes; while edible fat-containing products likewise become non-edible on deterioration of the fat constituent. In the manufacture of crackers and other bakery products where fats are used and where the products are kept for considerable periods of time, there is a very considerable hazard and frequently very considerable loss due to this oxidation or rancidity of the fat contained in such products.

We have found that it is possible to stabilize fats and oils not only in the package during distribution but also in the food products, such as bakery products, in which the oils and fats are used, by incorporating in the oils and fats a small amount of a suitable stabilizing agent.

It has heretofore been proposed to increase the stability of oils and fats while in storage and in the package by incorporating small amounts of phenols therein; but such phenols are more or less soluble in water and, due to this fact, they are extracted from the oil or fat when the shortening is mixed with other ingredients containing moisture; and this is especially true if and when the other ingredients are alkaline or contain alkaline constituents. Thus, pyrogallol and pyrocatechin added in small amount to lard will improve the keeping quality of pure lard to a very considerable extent; but they have little or no effect in stabilizing the lard and retarding rancidity when it is incorporated in pie crusts.

We have found that substituted poly-phenols and poly-phenol derivatives which are soluble in the oil or fat and which are insoluble or practically so in water are effective not only in stabilizing the oil or fat during storage and in the package but also stabilize the oil or fat and retard oxidation and decomposition after they have been used as shortening in pie crusts or other bakery products.

Among the phenolic derivatives which we have found suitable are poly-phenols, especially ortho- and para-poly-phenols which contain substituting groups such that the phenol derivatives are insoluble or practically so in water. For example, while pyrocatechin will improve the keeping quality of pure lard but apparently has little or no effect of retarding rancidity of lard in pie crusts. Similarly the dimethyl ether of pyrogallol is an effective anti-oxidant in pie crusts.

For practical use in an edible product the anti-oxidant or stabilizing agent added to the lard or other edible oil or fat should be non-toxic and should be of such a nature that it will be eliminated properly when taken internally as a constituent of food. Phenols are widely distributed in nature, occurring in many natural food products in small quantity; and the physiological mechanism for handling small quantities of phenols is well known. The water insolubility of the phenolic derivatives employed in the present invention is an aid in discarding and elimination of the phenols, since it limits the amount absorbed from the digestive tract. In general the stabilizing agents to be of general application should be odorless, tasteless and colorless.

The class of compounds which we have found particularly suitable for use with edible oils and fats are condensation products of phenols with ketones or aldehydes. We have found the condensation product of pyrogallol and acetone, in the presence of hydrochloric acid, an unusually effective product in the preservation of oils or fats, not only in a pure state, but also after mixing in pie crusts and other bakery products. We have obtained very satisfactory results by dissolving quantities as low as 0.01% or less of such condensation products in lard or other fats. This condensation product can be made by dissolving the pyrogallol in slightly more than molecular quantities of acetone and passing in dry hydrogen chloride. Presumably this product is gallacetonin, but we have not established its chemical identity.

In general, the substances which are insoluble or least soluble in water appear to be most effective in stabilizing the oil or fat product after it has been incorporated in a mixture of other ingredients as in the case of the manufacture of pie crust, for example. The condensation product of pyrogallol and acetone is almost entirely insoluble in water but quite soluble in oils or fats. When pure or in a purified state it has apparently no toxic properties. It produces, when mixed with lard, in quantities as small as 0.01%, an increase in the keeping qualities of the lard, under certain tests, up to 1000% or more.

Other stabilizing agents which we have found effective in stabilizing lard and other oil and fat products, both in a pure state and in pie crust, etc. are the following:

Stearolated pyrogallol, $C_6H_2(OH)_3CO.C_{17}H_{35}$
Pyrogallol dimethyl ether
Quinol-anisaldehyde condensation product
1.4 and 1.5-dihydroxy-naphthalenes The amounts of the different stabilizing agents to be used can be varied somewhat, but in general only a small fraction of 1% will be used. The stabilizing agents are incorporated in the oil or fat by dissolving in the oil or fat in which they are soluble. These substances, however, contain groups or groupings which render them insoluble in water or practically so, so that they are thereby made effective in stabilizing the oil or fat against rancidity in the presence of moisture and other ingredients, such as the protein constitutents present in bakery products.

The stability of edible oils and fats is commonly determined by so-called accelerated aging tests carried out at relatively high temperatures to produce in a short time changes such as would in practice require far longer periods of time, and determining, by such high temperature tests, the time necessary to produce a definite odor of rancidity.

The criterion of rancidity which we have used to demonstrate the improved keeping qualities of oils and fats stabilized according to the present invention is that of odor and taste after subjection of a sample of incubation at 70° C. for a period of time necessary to produce a typically rancid odor. In comparing the stability of the fats themselves, a 50 gram portion of the sample is weighed out and placed in a small glass container of about 250 cc. capacity having a loose fitting cover. This container is then placed in an incubator which has been regulated definitely to 70° C. and allowed to remain until daily inspections show it to be rancid to the senses of taste and smell. The time required for the development of this rancidity is taken as a measure of the resistance of the fat to rancidity.

In testing the stability of the fat after having been made into bakery products, etc., the fat is used in the manufacture of a small lot of pie crust under carefully controlled conditions to prevent contamination with other fats or metals which promote oxidation. Care is further taken to use entirely analogous ingredients for each sample of a series under comparison. These pie crusts are then baked out, being careful that all of the series in a single comparison are in the same oven at the same temperature for the same length of time. The baked pie crusts are then crumbled and placed in 250 cc. containers with loose fitting covers and incubated at 70° C. until definite rancidity develops. Again the length of time required to develop this rancidity is a measure of the stability of the fat.

We claim:

1. A baking composition comprising stabilized edible oils and fats which are stabilized during storage and distribution and when subsequently used with water in the manufacture of bakery products, said oils and fats having incorporated therein a fraction of 1% of a non-toxic and substantially odorless and tasteless amino-free phenol derivatives selected from the group consisting of polyphenols, substituted polyphenols, and condensation products of polyphenols with ketones or aldehydes, said polyphenol derivative being soluble in the oil or fat, but having such insolubility in hot water and stability at high temperatures that it will remain in the oil or fat when used with water in the manufacture of bakery products, and stabilizes the same during such use and in the resulting bakery product.

2. Bakery products containing therein stabilized oils or fats, stabilized by the presence therein of a fraction of 1% of a non-toxic and substantially odorless and tasteless amino-free phenol derivative selected from the group consisting in polyphenols, substituted polyphenols, and condensation products of polyphenols with ketones or aldehydes, said polyphenol derivative being soluble in the oil or fat, but having such insolubility in hot water and stability at high temperatures that it remains in the oil or fat in said bakery products and stabilizes the same.

3. The process of stabilizing oils or fats which comprises incorporating therein a small amount of a condensation product of pyrogallol and acetone which is substantially insoluble in water but soluble in the oil or fat.

4. The process of stabilizing oils or fats used in food products in which, or in the manufacture of which, water is used, which comprises incorporating in the oil or fat a small amount of a condensation product of pyrogallol and acetone, and incorporating the resulting oil or fat in the food products.

5. Stabilized oils or fats containing therein a small amount of a condensation product of pyrogallol and acetone substantially insoluble in water but soluble in the oil or fat.

6. Food products in which, or in the manufacture of which, water is used, said products containing therein oils or fats stabilized by the presence therein of a small amount of a condensation product of pyrogallol and acetone.

WILLIAM D. RICHARDSON.
DONALD P. GRETTIE.
ROY C. NEWTON.